US011708751B2

(12) United States Patent
Kibodeaux et al.

(10) Patent No.: US 11,708,751 B2
(45) Date of Patent: Jul. 25, 2023

(54) METHOD OF DEPLOYING CARBON DIOXIDE FOAM FLOODING IN AN OIL RESERVOIR

(71) Applicant: Saudi Arabian Oil Company, Dhahran (SA)

(72) Inventors: Kenneth Richard Kibodeaux, Pearland, TX (US); Huseyin Onur Balan, Katy, TX (US); Anuj Gupta, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/401,708

(22) Filed: Aug. 13, 2021

(65) Prior Publication Data
US 2022/0049589 A1 Feb. 17, 2022

Related U.S. Application Data

(60) Provisional application No. 63/065,170, filed on Aug. 13, 2020.

(51) Int. Cl.
*E21B 43/16* (2006.01)
*C09K 8/594* (2006.01)

(52) U.S. Cl.
CPC .......... *E21B 43/164* (2013.01); *E21B 43/168* (2013.01); *C09K 8/594* (2013.01)

(58) Field of Classification Search
None
See application file for complete search history.

(56) References Cited

U.S. PATENT DOCUMENTS

| 4,113,011 | A |   | 9/1978 | Bernard et al. |   |
| 4,393,937 | A | * | 7/1983 | Dilgren | E21B 43/24 507/936 |
| 4,828,032 | A |   | 5/1989 | Teletzke et al. |   |
| 5,027,898 | A | * | 7/1991 | Naae | E21B 43/24 166/305.1 |
| 2012/0103635 | A1 | * | 5/2012 | Sanders | C09K 8/584 166/402 |
| 2014/0224484 | A1 | * | 8/2014 | Abbas | E21B 43/164 166/270.1 |
| 2016/0075932 | A1 | * | 3/2016 | Silveira | C09K 8/703 166/305.1 |
| 2017/0251607 | A1 | * | 9/2017 | Pellenc | A01G 3/037 |

OTHER PUBLICATIONS

Li et al. "Foam Mobility Control for Surfactant Enhanced Oil Recovery", SPE 113910 Dec. 2010 (Year: 2010).*
Alcorn et al., "An Integrated Carbon-Dioxide-Foam Enhanced-Oil-Recovery Pilot Program With Combined Carbon Capture, Utilization, and Storage in an Onshore Texas Heterogeneous Carbonate Field," SPE Reservoir Engineering, Nov. 2019, 22:04 (1449-1466), 18 pages.

(Continued)

*Primary Examiner* — Charles R Nold
(74) *Attorney, Agent, or Firm* — Fish & Richardson P.C.

(57) ABSTRACT

Provided are methods of recovering oil from a reservoir using carbon dioxide foam flooding in which a carbon dioxide foam of increased strength is used.

35 Claims, 1 Drawing Sheet

(56) References Cited

OTHER PUBLICATIONS

Chou et al., "CO2 Foam Field Trial at North Ward-Estes," SPE 24643, Society of Petroleum Engineers (SPE), presented at the Society of Petroleum Engineers Annual Technical Conference, Washington, D.C. 1992, 12 pages.

Heller et al., "Testing CO2-Foam for Mobility Control at Rock Creek," SPE 14519, Society of Petroleum Engineers (SPE), presented at the Society of Petroleum Engineers Eastern Regional Meeting, Morgantown, West Virginia 1985, 14 pages.

Henry et al., "Field Test of Foam to Reduce CO2 Cycling," SPE 35402, Society of Petroleum Engineers (SPE), presented at the Society of Petroleum Engineers/Department of Energy Symposium on Improved Oil Recovery, Tulsa, Oklahoma 1996, 6 pages.

Hoefner and Evans, "CO2 Foam: Results from Four Developmental Field Trials," SPE Reservoir Engineering, Nov. 1995, 9 pages.

Jonas et al., "Evaluation of a CO2 Foam Field Trial: Rangely Weber Sand Unit," SPE 20468, Society of Petroleum Engineers (SPE), presented at the Society of Petroleum Engineers Annual Technical Conference, New Orleans, Louisiana 1990, 14 pages.

Martin et al., "CO2-Foam Field Test at the East Vacuum Grayburg/ San Andres Unit," SPE Reservoir Engineering, Nov. 1995, 7 pages.

Patil et al., "CO2 Foam Field Pilot Test in Sandstone Reservoir: Complete Analysis of Foam Pilot Response," SPE 190312, Society of Petroleum Engineers (SPE), presented at the Society of Petroleum Engineers Improved Oil Recovery Conference, Tulsa, 2018, 14 pages.

Sanders et al., "Implementation of a CO2 Foam Pilot Study in the SACROC Field: Performance Evaluation," SPE 160016, Society of Petroleum Engineers (SPE), presented at the Society of Petroleum Engineers Annual Technical Conference, San Antonio, Texas 2012, 13 pages.

Solbakken, "Experimental Studies of N2- and CO2-Foam Properties in Relation to Enhanced Oil Recovery Applications," Ph.D, dissertation, University of Bergen, 2015, 353 pages.

Stephenson et al., "Mobility control experience in the Joffre Viking miscible CO2 flood." SPE Reservoir Engineering 8.03, Aug. 1993, 183-188, 6 pages.

Zeng et al., "Role of Gas Type on Foam Transport in Porous Media," Langmuir, 32, Jun. 2016, 6239-6245, 7 pages.

Siddiqui et al., "Stability and Texture of CO2/N2 Foam in Sandstone" Colloids and Surfaces A: Physiochemical and Engineering Aspects, vol. 534, May 24, 2017, 26-37, 12 pages.

Szabries et al. "Foam Analysis at Elevated Pressures for Enhanced Oil Recovery Applications" Energy & Fuels, vol. 33, No. 5, May 16, 2019, 10 pages.

PCT International Search Report and Written Opinion in International Appln. No. PCT/US2021/045938, dated Nov. 26, 2021, 16 pages.

\* cited by examiner

METHOD OF DEPLOYING CARBON DIOXIDE FOAM FLOODING IN AN OIL RESERVOIR

RELATED APPLICATIONS

This application claims the benefit of priority of U.S. Prov. Appl. No. 63/065,170, filed Aug. 13, 2020, which is incorporated herein by reference in its entirety.

TECHNICAL FIELD

This document relates to a method of oil recovery from a reservoir using carbon dioxide foam flooding, particularly carbon dioxide foam with increased foam strength.

BACKGROUND

Carbon dioxide ($CO_2$) flooding can be effective at recovering remaining oil from a reservoir, even one that has already undergone primary depletion and subsequent water-flooding. However, it is common for the $CO_2$ not to sweep the entire target volume, due to channeling (injectant preferentially sweeping the higher-permeability layers) and gravity override (buoyant $CO_2$ preferentially sweeps the reservoir's uppermost layers), harming vertical sweep, areal sweep, or both.

A primary cause of the unfavorable sweep is a condition where the viscosity of the injectant is lower than that of the oil that it is intended to displace. To address this problem, the apparent viscosity of the $CO_2$ is increased, commonly by foaming the $CO_2$ in situ. This can be accomplished by alternate injection of slugs of $CO_2$ and surfactant-laden brine. The surfactant stabilizes foam lamellae in the $CO_2$ within the rock, adding additional resistance to $CO_2$ flow. The more stable the lamellae, the more lamellae exist, and the greater the increase in $CO_2$ apparent viscosity.

A problem in this usage lies in the inherent weakness of $CO_2$ foam. The water solubility of $CO_2$ is much greater than most other enhanced oil recovery (EOR) injectants. This limits the magnitude of the change in pressure ($\Delta P$) that can be maintained across a curved foam lamella, because excessive $\Delta P$ leads to diffusion of $CO_2$ from one side to the other while the lamella stays stationary. This relieves the $\Delta P$, thus providing a mechanism for limiting the magnitude of $\Delta P$ across a lamella, which in turn limits the degree of increase in apparent $CO_2$ viscosity by foam. This weakness of $CO_2$ foam results in limited success when used to increase $CO_2$ sweep. Thus, an improved method is needed for $CO_2$ foam flooding that results in increased foam strength.

SUMMARY

Provided in this disclosure is a method for recovering oil from a reservoir. In some embodiments, the method involves: providing a first foam comprising carbon dioxide ($CO_2$) to the reservoir; providing a second foam to the reservoir, wherein the second foam is produced by alternately injecting into the reservoir: a gas-mixture comprising $CO_2$ and nitrogen ($N_2$) or $CO_2$ and methane ($CH_4$) or $CO_2$ and $N_2$ and $CH_4$; and a solution comprising brine and a surfactant; and recovering oil from the reservoir.

In some embodiments of the method, the gas-mixture comprises $CO_2$ and $N_2$. In some embodiments, the gas-mixture comprises about 1 mol % to about 99 mol % $N_2$. In some embodiments, the gas-mixture comprises $CO_2$ and $CH_4$. In some embodiments, the gas-mixture comprises about 1 mol % to about 99 mol % $CH_4$. In some embodiments, the gas-mixture is provided as a slug.

In some embodiments of the method, the surfactant in the solution comprising brine and a surfactant is selected from a nonionic surfactant, an anionic surfactant, a zwitterionic surfactant, and combinations thereof. In some embodiments, the surfactant comprises about 1% to about 15% of the solution. In some embodiments, the solution comprising brine and a surfactant is provided as a slug.

In some embodiments of the method, providing the second foam to the reservoir is repeated until the recovery of the oil from the reservoir reaches an economic limit. In some embodiments, providing the second foam to the reservoir is performed one time or more than one time.

In some embodiments of the method, the first foam is formed in situ in the reservoir. In some embodiments, the first foam is formed by alternately injecting a solution comprising $CO_2$ and a solution comprising brine and a surfactant. In some embodiments, the solution comprising $CO_2$ and the solution comprising brine and a surfactant are each provided as slugs. In some embodiments, the alternate injection of the solution comprising $CO_2$ and the solution comprising brine and a surfactant is repeated until the recovery of the oil from the reservoir reaches an economic limit. In some embodiments, the alternate injection of the solution comprising $CO_2$ and the solution comprising brine and a surfactant is performed one time or more than one time.

In some embodiments, the method comprises injecting a solution comprising $N_2$ and a solution comprising brine and a surfactant after providing the first foam to the reservoir. In some embodiments, the solution comprising $N_2$ and a solution comprising brine and a surfactant are injected simultaneously.

In some embodiments, the method results in a greater apparent viscosity of the $CO_2$ as compared to a method that does not include the step of providing the second foam to the reservoir. In some embodiments, the method increases the total sweep efficiency of the reservoir as compared to a method that does not include the step of providing the second foam to the reservoir. In some embodiments, the method provides increased oil recovery as compared to a method that does not include the step of providing the second foam to the reservoir.

Also provided in the present disclosure is a method for flooding a reservoir with $CO_2$ foam, comprising providing a foam to the reservoir, wherein the foam is produced by alternately injecting into the reservoir: a gas-mixture comprising $CO_2$ and $N_2$ or $CO_2$ and $CH_4$ or $CO_2$ and $N_2$ and $CH_4$; and a solution comprising brine and a surfactant.

In some embodiments, the gas-mixture comprises $CO_2$ and $N_2$. In some embodiments, the gas-mixture comprises about 1 mol % to about 99 mol % $N_2$. In some embodiments, the gas-mixture comprises $CO_2$ and $CH_4$. In some embodiments, the gas-mixture comprises about 1 mol % to about 90 mol % $CH_4$. In some embodiments, the gas-mixture is provided as a slug.

In some embodiments, the surfactant in the solution comprising brine and a surfactant is selected from a nonionic surfactant, an anionic surfactant, a zwitterionic surfactant, and combinations thereof. In some embodiments, the surfactant comprises about 1% to about 15% of the solution. In some embodiments, the solution is provided as a slug.

In some embodiments of the method, the alternate injections of the gas-mixture and the solution are performed one time or more than one time.

In some embodiments, the method further comprises injecting into the reservoir a solution comprising $N_2$ and a solution comprising brine. In some embodiments, the solution comprising $N_2$ and a solution comprising brine and a surfactant are injected simultaneously. In some embodiments, the injection of a solution comprising $N_2$ and a solution comprising brine occurs before the foam is provided to the reservoir. In some embodiments, the injection of a solution comprising $N_2$ and a solution comprising brine occurs after the foam is provided to the reservoir.

DETAILED DESCRIPTION

Figure 1:
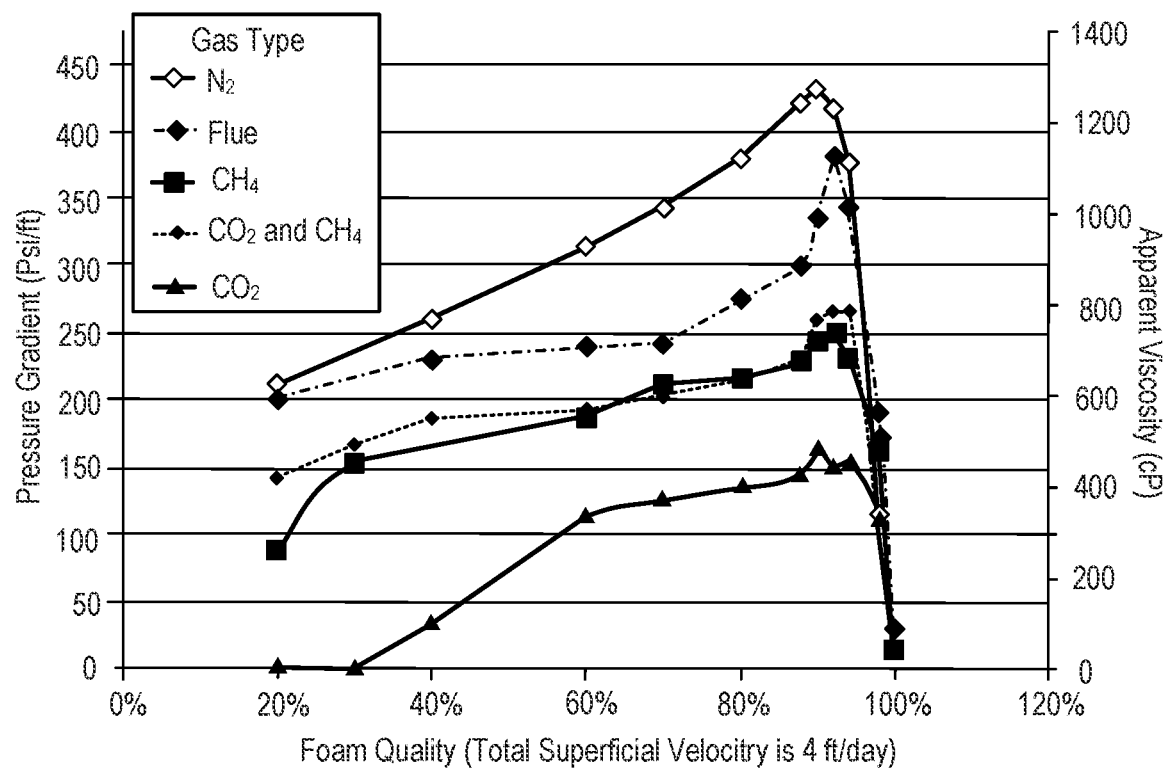
FIG. 1 shows the effect of gas composition on foam strength.

The present disclosure provides methods for recovering oil from a reservoir using carbon dioxide ($CO_2$) foam flooding. The methods of the present disclosure utilize a $CO_2$ foam that has been made stronger by dilution with nitrogen ($N_2$) or methane ($CH_4$). Methane is less water-soluble than $CO_2$, and $N_2$ even less so. Therefore, in some embodiments, $CO_2$ foam strength increases from a weak foam to a stronger foam by adding $CH_4$ or $N_2$. The methods of the present disclosure using the stronger $CO_2$ foam result in an improved volumetric sweep.

Additionally, $CO_2$ has the greatest local displacement efficiency (lowest residual oil saturation ($S_{or}$)), followed by $CH_4$, with $N_2$ leaving behind the greatest $S_{or}$. Thus, in some embodiments, the methods of the present disclosure maximize oil recovery by first allowing $CO_2$ to sweep as much oil as it can by $CO_2$ flooding followed by $CO_2$ foam flooding using the stronger $CO_2$ foam. In some embodiments, subsequent injection of $N_2$ along with $CO_2$ foam enables sweeping of some of the remaining unswept regions, albeit at a higher $S_{or}$. Thus, the methods of the present disclosure maximize total sweep efficiency of the target reservoir volume. In some embodiments, as the $N_2$-laden $CO_2$ front moves through the reservoir, some of the $CO_2$ partitions from the vapor into the in situ liquid oleic phase. In some embodiments, this results in a leading-edge of the advancing $CO_2$-front that is enriched in $N_2$, which improves sweep even more due to increased foam strength at the propagating foam front. In some embodiments, this method is used in regions of the reservoir unswept by $CO_2$, where the oil is not yet saturated with $CO_2$.

Also provided are methods for improving $CO_2$ foam processes though generation of a stronger $CO_2$ foam. In some embodiments, the methods increase $CO_2$ sweep. In some embodiments, the methods result in greater oil recovery as compared to methods where a $CO_2$ foam is used that does not contain $N_2$ or $CH_4$.

The methods of the present disclosure can be used in any type of reservoir or underground formation, such as sandstone or carbonate or porous or fractured rock formation.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1 to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

As used herein, "strong foam" means foam that causes a large reduction in gas viscosity, while "weak foam" means foam that causes only a small reduction in gas viscosity. Stronger foam results in greater improvement in sweep efficiency of the injectant.

As used herein, the term "sweep efficiency" refers to a measure of the effectiveness of an enhanced oil recovery process. In some embodiments, sweep efficiency is the percentage of the reservoir volume displaced of oil by an injection fluid at a particular time.

Residual oil saturation ($S_{or}$) is defined as the fraction of the reservoir pore volume which does not flow.

Method for Recovering Oil from a Reservoir

Provided in the present disclosure are methods for recovering oil from a reservoir. The methods of the present disclosure are improved methods for flooding a reservoir with $CO_2$, resulting in increased sweep efficiency, as compared to, for example, standard methods of $CO_2$ foam flooding. The methods of the present disclosure include: providing a first foam comprising carbon dioxide ($CO_2$) to the reservoir; providing a second foam to the reservoir, where the second foam is produced by alternately injecting into the reservoir a gas-mixture comprising $CO_2$ and nitrogen ($N_2$) or $CO_2$ and methane ($CH_4$); and a solution comprising brine and a surfactant; and recovering oil from the reservoir.

In some embodiments, the methods of the present disclosure result in a greater apparent viscosity of the $CO_2$ in the foam as compared to a method of $CO_2$ foam flooding that does not include flooding with a $CO_2$ foam diluted with either $N_2$ or $CH_4$. In some embodiments, the methods of the present disclosure increase the total sweep efficiency of the reservoir as compared to a method of $CO_2$ foam flooding that does not include flooding with a $CO_2$ foam diluted with either $N_2$ or $CH_4$. In some embodiments, the methods of the present disclosure provide increased oil recovery as compared to a method of $CO_2$ foam flooding that does not include flooding with a $CO_2$ foam diluted with either $N_2$ or $CH_4$.

$CO_2$ Foam Flooding

In some embodiments, the first step of the method includes injecting a first foam containing $CO_2$ into a reservoir or well. For example, the first step can be any method of $CO_2$ foam flooding used in enhanced oil recovery (EOR) applications known to those skilled in the art. Thus, in some embodiments of the method, the first foam is any $CO_2$-containing foam that is typically used for foam flooding.

The foam can be formed in any one of a number of ways. In some embodiments, the foam is generated at the surface by combining the ingredients in a suitable mixing device, such as a foam generator, then injected into the reservoir. In other embodiments, the foam is generated in situ by injecting the ingredients of the foam either separately or simultaneously into the reservoir. In yet other embodiments, two or more of the components are mixed together at the surface prior to introduction into the well, then the foam forms during its passage down the well and in the reservoir in the vicinity of the well.

In some embodiments of the provided method, the foam is formed in situ in the reservoir. In some embodiments, forming the foam in situ includes alternately injecting a gas-mixture containing $CO_2$ and a solution containing brine and a surfactant into the reservoir. In some embodiments, the gas-mixture and the solution are each injected as slugs. In further embodiments, the steps of injecting the carbon dioxide slug and the brine and surfactant slug is repeated in alternating fashion to enhance recovery of oil from a reservoir.

In some embodiments of the method, the alternate injections of the gas-mixture containing $CO_2$ and the solution containing brine and a surfactant are each performed one time or more than one time. For example, the gas-mixture and the solution can each be injected one time, two times, three times, four times, five times, or more. The number of times the gas-mixture and the solution are injected can depend on any number of factors. For example, the number of times the gas-mixture and the solution are injected can depend on the process design for a specific reservoir. In some embodiments, the number of times the gas-mixture and the solution are injected depends on the availability of surface injection facilities. In some embodiments, the alternate injections are repeated until a foam comprising $CO_2$ has formed. In some embodiments, the alternate injections of the gas-mixture containing $CO_2$ and the solution containing brine and a surfactant are repeated until the recovery of the oil from the reservoir reaches an economic limit. Regarding the economic limit of a well (reservoir) or group of wells, there are costs associated with keeping a well on production, including, but not limited to, artificial lift, surface fluid processing and transport, production testing and monitoring, and well and equipment maintenance. The well (reservoir) or group of wells must not only produce enough valuable fluids, such as oil, to cover all such costs, but also provide an adequate profit for the company. For example, where $CO_2$ is injected, often a large fraction of the injected $CO_2$ is produced at the production wells. There is a cost associated with handling these sometimes very large quantities of gas. In other examples, the same reasoning applies to having to handle large amounts of produced water in some wells. The economic limit is the flow rate below which the oil and gas production rates have insufficient value to cover the associated costs and the required profit margin.

The amount of the carbon dioxide injected into the reservoir will vary for different reservoirs, and will be dependent upon total reservoir pore volume, hydrocarbon pore volume, and other unique reservoir characteristics. In some embodiments, the amount of carbon dioxide injected depends on the effective pore volume, which is the portion of the reservoir which is expected to be contacted by the carbon dioxide injected. Effective pore volume can be determined by conventional laboratory and field techniques known to those of skill in the art.

The surfactant included in the brine solution can be any surfactant capable of forming a foam with $CO_2$. In some embodiments, the surfactant is selected from a nonionic surfactant, an anionic surfactant, a zwitterionic surfactant, and combinations thereof.

Diluted $CO_2$ Foam Flooding

In some embodiments, the method includes providing a foam to the reservoir that contains $CO_2$ diluted with either nitrogen ($N_2$) or methane ($CH_4$), or both $N_2$ and $CH_4$. Without wishing to be bound by any particular theory, it is believed that $CO_2$ foam can be made stronger by dilution with small concentrations of $N_2$ or $CH_4$. Methane is less water-soluble than $CO_2$, and $N_2$ even less so. Therefore, $CO_2$ foam can increase in strength by adding $CH_4$ or $N_2$. Stronger foam can lead to improvement in volumetric sweep.

In some embodiments of the method, the diluted foam containing $CO_2$ and either $N_2$ or $CH_4$ or both $N_2$ and $CH_4$ is provided to the reservoir after providing a first foam containing $CO_2$ to the reservoir. In some embodiments of the method, the diluted foam containing $CO_2$ and either $N_2$ or $CH_4$ or both $N_2$ and $CH_4$ is provided to the reservoir after $CO_2$ foam flooding has been performed, such as $CO_2$ foam flooding used in enhanced oil recovery (EOR) applications known to those skilled in the art.

In some embodiments, the diluted foam containing $CO_2$ and either $N_2$ or $CH_4$ or both $N_2$ and $CH_4$ is produced by alternately injecting into the reservoir a gas-mixture containing $CO_2$ and $N_2$, a gas-mixture containing $CO_2$ and $CH_4$, or a gas mixture containing $CO_2$, $N_2$ and $CH_4$; and a solution containing brine and a surfactant. In some embodiments, the gas-mixture is provided as a slug. In some embodiments, the solution containing brine and a surfactant is provided as a slug.

In some embodiments, the gas-mixture contains $CO_2$ and $N_2$. The gas-mixture can contain an amount of $N_2$ that is sufficient to increase the strength of the foam once formed. In some embodiments, the gas-mixture contains about 1 mol % to about 99 mol % $N_2$, for example, about 1 mol % to about 90 mol %, about 10 mol % to about 80 mol %, about 20 mol % to about 70 mol %, about 30 mol % to about 60 mol %, or about 50 mol % $N_2$. In some embodiments, the gas-mixture contains about 1 mol %, about 5 mol %, about 10 mol %, about 15 mol %, about 20 mol %, about 25 mol %, about 30 mol %, about 35 mol %, about 40 mol %, about 45 mol %, about 50 mol %, about 55 mol %, about 60 mol %, about 65 mol %, about 70 mol %, about 75 mol %, about 80 mol %, about 85 mol %, about 90 mol %, about 95 mol %, or about 99 mol % $N_2$.

In some embodiments, the gas-mixture contains $CO_2$ and $CH_4$. The gas-mixture can contain an amount of $CH_4$ that is sufficient to increase the strength of the foam once formed. In some embodiments, the gas-mixture contains about 1 mol % to about 99 mol % $CH_4$, for example, about 1 mol % to about 90 mol %, about 10 mol % to about 80 mol %, about 20 mol % to about 70 mol %, about 30 mol % to about 60 mol %, or about 50 mol % $CH_4$. In some embodiments, the gas-mixture contains about 1 mol %, about 5 mol %, about 10 mol %, about 15 mol %, about 20 mol %, about 25 mol %, about 30 mol %, about 35 mol %, about 40 mol %, about 45 mol %, about 50 mol %, about 55 mol %, about 60 mol %, about 65 mol %, about 70 mol %, about 75 mol %, about 80 mol %, about 85 mol %, about 90 mol %, about 95 mol %, or about 99 mol % $CH_4$.

In some embodiments, the gas-mixture contains $CO_2$ and both $N_2$ and $CH_4$. The gas-mixture can contain a total amount of $N_2$ and $CH_4$ that is sufficient to increase the strength of the foam once formed. In some embodiments, the gas-mixture contains about 1 mol % to about 99 mol % $N_2$ and $CH_4$, for example, about 1 mol % to about 90 mol %, about 10 mol % to about 80 mol %, about 20 mol % to about 70 mol %, about 30 mol % to about 60 mol %, or about 50 mol % $N_2$ and $CH_4$. In some embodiments, the gas-mixture contains about 1 mol %, about 5 mol %, about 10 mol %, about 15 mol %, about 20 mol %, about 25 mol %, about 30 mol %, about 35 mol %, about 40 mol %, about 45 mol %, about 50 mol %, about 55 mol %, about 60 mol %, about 65 mol %, about 70 mol %, about 75 mol %, about 80 mol %, about 85 mol %, about 90 mol %, about 95 mol %, or about 99 mol % $N_2$ and $CH_4$.

The amount of the gas-mixture containing carbon dioxide and either $N_2$ or $CH_4$ or both $N_2$ and $CH_4$ injected into the reservoir will vary for different reservoirs, and will be dependent upon total reservoir pore volume, hydrocarbon pore volume, reservoir fluid composition and other unique reservoir characteristics. In some embodiments, the amount of carbon dioxide injected depends on the effective pore volume, which is the portion of the reservoir which is expected to be contacted by the carbon dioxide injected. Effective pore volume can be determined by conventional laboratory and field techniques known to those of skill in the art.

The surfactant included in the brine solution can be any surfactant capable of forming a foam with $CO_2$. In some embodiments, the surfactant is selected from a nonionic surfactant, an anionic surfactant, a zwitterionic surfactant, and combinations thereof. Suitable surfactants include, but are not limited to a cocamidopropyl betaine surfactant (for example, Amphosol®, sold by Stepan Company, Northfield, Ill., USA), sodium dodecyl sulfonate, and selected anionic, cationic, zwitterionic or optimized proprietary blends of many surfactants.

In some embodiments, the solution contains about 0.1% to about 5% of the surfactant, such as about 0.1% to about 4%, about 0.5% to about 3%, about 1% to about 2%, or about 0.1%, about 0.2%, about 0.3%, about 0.4%, about 0.5%, about 0.6%, about 0.7%, about 0.8%, about 0.9%, about 1%, about 1.5%, about 2%, about 2.5%, about 3%, about 3.5%, about 4%, about 4.5%, or about 5% surfactant.

In some embodiments of the method, the alternate injections of the gas-mixture containing $CO_2$ and either $N_2$ or $CH_4$ or both $N_2$ and $CH_4$ and the solution containing brine and a surfactant are each performed one time or more than one time. For example, the gas-mixture and the solution can each be injected one time, two times, three times, four times, five times, or more. In some embodiments, the alternate injections are repeated until a foam has formed. In some embodiments, the alternate injections of the gas-mixture and the solution are repeated until the recovery of the oil from the reservoir reaches an economic limit.

$N_2$ Foam Injection

In some embodiments of the method, the method further includes a step of injecting an $N_2$ foam into the reservoir. In some embodiments, the $N_2$ foam is formed by injecting a solution containing $N_2$ and a solution containing brine and a surfactant into the reservoir. In some embodiments, the solution containing $N_2$ and the solution containing brine and a surfactant are injected simultaneously. In some embodiments, the solution containing $N_2$ and the solution containing brine and a surfactant are injected sequentially. In some embodiments, the solution containing $N_2$ is injected first, followed by injection of the solution containing brine and a surfactant. In some embodiments, the $N_2$ foam is provided as a slug.

In some embodiments, the $N_2$ foam is provided to the reservoir prior to providing the diluted foam containing $CO_2$ and either $N_2$ or $CH_4$ or both $N_2$ and $CH_4$. In some embodiments of the method, the $N_2$ foam is provided to the reservoir after providing a first foam containing $CO_2$ to the reservoir. In some embodiments of the method, the $N_2$ foam is provided to the reservoir after $CO_2$ foam flooding has been performed, such as $CO_2$ foam flooding used in enhanced oil recovery (EOR) applications known to those skilled in the art. Without wishing to be bound by any theory, it is believed that because $CO_2$ has a higher local displacement efficiency (lowest residual oil saturation ($S_{or}$)) than $N_2$, allowing $CO_2$ to first sweep as much oil from the reservoir by $CO_2$ foam flooding, the subsequent injection of the $N_2$ foam enables improved volumetric sweeping of the remaining unswept regions, albeit at a higher $S_{or}$, thus maximizing total sweep efficiency of the target reservoir volume.

Method for Flooding a Reservoir

Also provided in the present disclosure are methods for flooding a reservoir with diluted $CO_2$ foam, such as the diluted foam provided herein. In some embodiments, the foam is diluted with $N_2$. In some embodiments, the foam is diluted with methane. In some embodiments, the foam is diluted with both $N_2$ and methane. The method includes providing a foam to a reservoir, where the foam is produced by alternately injecting into the reservoir a gas-mixture containing $CO_2$ and $N_2$ or $CO_2$ and $CH_4$ or $CO_2$ and $N_2$ and $CH_4$; and a solution comprising brine and a surfactant. In some embodiments, the gas-mixture is provided as a slug. In some embodiments, the solution is provided as a slug.

In some embodiments of the method, the alternate injections of the gas-mixture containing $CO_2$ and either $N_2$ or $CH_4$ or both $N_2$ and $CH_4$ and the solution containing brine and a surfactant are each performed one time or more than one time. For example, the gas-mixture and the solution can each be injected one time, two times, three times, four times, five times, or more. In some embodiments, the alternate injections are repeated until a foam has formed. In some embodiments, the alternate injections of the gas-mixture and the solution are repeated until the recovery of the oil from the reservoir reaches an economic limit.

In some embodiments of the method, the method further includes a step of injecting an $N_2$ foam into the reservoir. In some embodiments, the $N_2$ foam is formed by injecting a solution containing $N_2$ and a solution containing brine and a surfactant into the reservoir. In some embodiments, the solution containing $N_2$ and the solution containing brine and a surfactant are injected simultaneously. In some embodiments, the solution containing $N_2$ and the solution containing brine and a surfactant are injected sequentially. In some embodiments, the solution containing $N_2$ is injected first, followed by injection of the solution containing brine and a surfactant. In some embodiments, the $N_2$ foam is provided as a slug.

In some embodiments, the $N_2$ foam is provided to the reservoir prior to providing the diluted foam containing $CO_2$ and either $N_2$ or $CH_4$ or both $N_2$ and $CH_4$. In some embodiments, the $N_2$ foam is provided to the reservoir after providing the diluted foam containing $CO_2$ and either $N_2$ or $CH_4$ or both $N_2$ and $CH_4$.

Thus, also provided are methods for increasing sweep efficiency using the diluted $CO_2$ foam containing either $N_2$ or $CH_4$ or both $N_2$ and $CH_4$.

Other Applications

The methods of the present disclosure can be used in any subterranean formation or reservoir where oil recovery is desired. For example, the methods can be used to recover remaining oil from a reservoir that has already undergone primary depletion and subsequent waterflooding. The methods can be used to produce oil from a reservoir after secondary or tertiary production methods have been performed. The methods of the present disclosure can be used in carbonate formations or sandstone formations.

Examples

Figure 2:
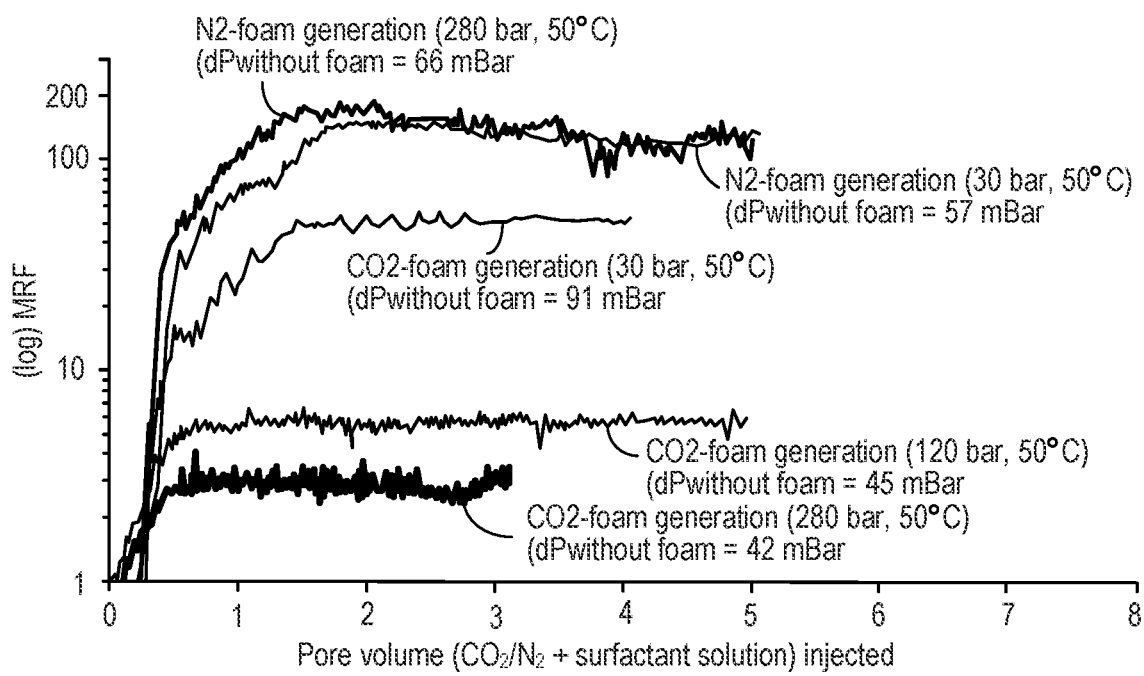
FIG. 2 shows the effect of pressure on $CO_2$ foam.

Laboratory flooding experiments of reservoir core plug samples were conducted to demonstrate the effects of gas composition on foam in porous media. Foams containing different gases ($N_2$, flue gas (a mixture of 20 mol % $CO_2$ and 80 mol % $N_2$ emitted as exhaust from power plants), $CH_4$, $CO_2$, and a mixture of $CO_2$ and $CH_4$ (50/50 mol %)) were prepared and the strength of the foam was tested across a pressure gradient, as described in Zeng et al., Langmuir, 32:6239-6245 (2016). FIG. 1 displays the apparent viscosity of foam of different compositions at low pressures (greater pressure gradient means greater apparent viscosity). At low pressure conditions, $CO_2$ was a weaker foam, with $CH_4$ twice as strong and $N_2$ three times as strong. Mixing $CO_2$ with other gases resulted in a foam as strong as the other gases alone. Since $CO_2$ becomes more water-soluble at higher pressures, the $CO_2$ foam became much weaker. As shown in FIG. 2, at 30 bar $CO_2$ foam was only 5× weaker than $N_2$, while at 280 bar $CO_2$ foam was 100× weaker (note the logarithmic scale on the graph). See also Solbakken et al., Ph.D. dissertation, University of Bergen (2015).

Because many $CO_2$ floods occur at the higher reservoir pressures, this shows that diluting the injected $CO_2$ with other gases, such as $N_2$ or $CH_4$, at reservoir conditions can increase foam strength.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for recovering oil from a reservoir, comprising:
   providing a first foam comprising carbon dioxide ($CO_2$) to the reservoir;
   providing a second foam to the reservoir, wherein the second foam is produced in situ by alternately injecting into the reservoir:
   a gas-mixture comprising $CO_2$ and nitrogen ($N_2$) or $CO_2$ and methane ($CH_4$) or $CO_2$ and $N_2$ and $CH_4$; and
   a solution comprising brine and a surfactant, wherein the alternate injections of the gas-mixture and the solution are repeated until a foam has formed; and
   recovering oil from the reservoir.

2. The method of claim 1, wherein the gas-mixture comprises $CO_2$ and $N_2$.

3. The method of claim 2, wherein the gas-mixture comprises about 1 mol % to about 99 mol % $N_2$.

4. The method of claim 1, wherein the gas-mixture comprises $CO_2$ and $CH_4$.

5. The method of claim 4, wherein the gas-mixture comprises about 1 mol % to about 99 mol % $CH_4$.

6. The method of claim 1, wherein the gas-mixture is provided as a slug.

7. The method of claim 1, wherein the surfactant is selected from a nonionic surfactant, an anionic surfactant, a zwitterionic surfactant, and combinations thereof.

8. The method of claim 1, wherein the surfactant comprises about 1% to about 15% of the solution.

9. The method of claim 1, wherein the solution is provided as a slug.

10. The method of claim 1, wherein providing the second foam to the reservoir is repeated until the recovery of the oil from the reservoir reaches an economic limit wherein operating expenses exceed revenues.

11. The method of claim 1, wherein providing the second foam to the reservoir is performed more than one time.

12. The method of claim 1, wherein the first foam is formed in situ in the reservoir.

13. The method of claim 12, wherein the first foam is formed by alternately injecting a solution comprising $CO_2$ and a solution comprising brine and a surfactant.

14. The method of claim 13, wherein the solution comprising $CO_2$ and the solution comprising brine and a surfactant are each provided as slugs.

15. The method of claim 13, wherein the alternate injection of the solution comprising $CO_2$ and the solution comprising brine and a surfactant is repeated until the recovery of the oil from the reservoir reaches an economic limit wherein operating expenses exceed revenues.

16. The method of claim 13, wherein the alternate injection of the solution comprising $CO_2$ and the solution comprising brine and a surfactant is performed one time or more than one time.

17. The method of claim 1, wherein the method comprises injecting a solution comprising $N_2$ and a solution comprising brine and a surfactant after providing the first foam to the reservoir.

18. The method of claim 17, wherein the solution comprising $N_2$ and a solution comprising brine and a surfactant are injected simultaneously.

19. The method of claim 1, wherein the method results in a greater apparent viscosity of the $CO_2$ as compared to a method that does not include the step of providing the second foam to the reservoir.

20. The method of claim 1, wherein the method increases the total sweep efficiency of the reservoir as compared to a method that does not include the step of providing the second foam to the reservoir.

21. The method of claim 1, wherein the method provides increased oil recovery as compared to a method that does not include the step of providing the second foam to the reservoir.

22. A method for flooding a reservoir with $CO_2$ foam, comprising providing a foam to the reservoir, wherein the foam is produced by alternately injecting into the reservoir:
- a gas-mixture comprising $CO_2$ and nitrogen ($N_2$) or $CO_2$ and methane ($CH_4$) or $CO_2$ and $N_2$ and $CH_4$; and
- a solution comprising brine and a surfactant.

23. The method of claim 22, wherein the gas-mixture comprises $CO_2$ and $N_2$.

24. The method of claim 23, wherein the gas-mixture comprises about 1 mol % to about 99 mol % $N_2$.

25. The method of claim 22, wherein the gas-mixture comprises $CO_2$ and $CH_4$.

26. The method of claim 25, wherein the gas-mixture comprises about 1 mol % to about 90 mol % $CH_4$.

27. The method of claim 22, wherein the gas-mixture is provided as a slug.

28. The method of claim 22, wherein the surfactant is selected from a nonionic surfactant, an anionic surfactant, a zwitterionic surfactant, and combinations thereof.

29. The method of claim 22, wherein the surfactant comprises about 1% to about 15% of the solution.

30. The method of claim 22, wherein the solution is provided as a slug.

31. The method of claim 22, wherein the alternate injections of the gas-mixture and the solution are performed one time or more than one time.

32. The method of claim 22, wherein the method further comprises injecting into the reservoir a solution comprising $N_2$ and a solution comprising brine.

33. The method of claim 32, wherein the solution comprising $N_2$ and a solution comprising brine and a surfactant are injected simultaneously.

34. The method of claim 32, wherein the injection of a solution comprising $N_2$ and a solution comprising brine occurs before the foam is provided to the reservoir.

35. The method of claim 32, wherein the injection of a solution comprising $N_2$ and a solution comprising brine occurs after the foam is provided to the reservoir.

* * * * *